United States Patent Office 3,377,353
Patented Apr. 9, 1968

3,377,353
ETHANOANTHRACENE AMINES
William F. Bruce, Havertown, Pa., assignor to American Home Products Corporation, New York, N.Y., a corporation of Delaware
No Drawing. Filed May 26, 1964, Ser. No. 370,368
14 Claims. (Cl. 260—294)

This invention relates to novel ethanoanthracene amines having valuable pharmacological properties and to an improved method for preparing the same.

The claimed compounds exert qualitatively varying therapeutic effects, as evidenced by pharmacological evaluation according to standard test procedures. Thus the compounds of the invention show anticonvulsant, hypotensive, mydriatic, central nervous system depressant and sedative properties.

The claimed compounds can be represented generically by Formula I, below:

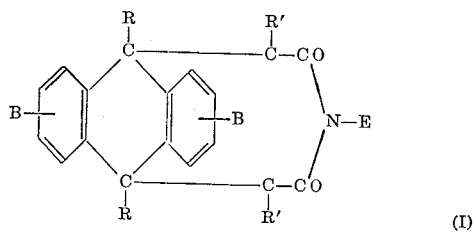

(I)

wherein B is hydrogen, amino, or nitro; R and R' are hydrogen or lower alkyl; E is selected from the group consisting of dialkylaminophenyl, 2-pyridyl, 3-pyridyl, dialkyl-2-pyridyl, halo-2-pyridyl, 2-pyridylmethyl, dialkoxyphenethyl, triazolyl, 3-piperidyl, piperidino, lower alkynyl, amino and guanidino; and the quaternary ammonium salts with (lower)alkyl, (lower)alkenyl and (lower)alkynyl halides and sulfates.

In the synthesis of the compounds of the invention, an ethanoanthracene anhydride (I) and an amine of the formula $ENH_2$ where E is as previously defined, are dissolved in an inert solvent such as dimethylformamide giving rise to a spontaneous reaction and solution. After heating for a short time to around 80° C., the solution is poured into water and a product of Formula (II) is recovered. This product can be quaternized readily with alkyl halides, alkyl sulfates, alkenyl halides and alkynyl halides.

To produce a quaternary ammonium salt of a compound of Formula III, a compound of Formula ZX, where Z is lower alkyl, lower alkenyl or alkynyl and X is halide or sulfate, is dissolved with a compound of Formula II in an inert solvent such as toluene, benzene, chloroform, ether or acetonitrile. The resulting reaction mixture is then warmed to around 80° C. until a precipitate appears. This precipitate is filtered and recrystallized to give the desired quaternized product.

The reactions occurring in the preparation of the claimed compounds are illustrated below:

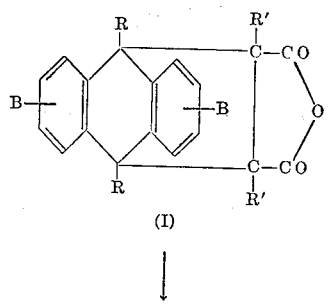

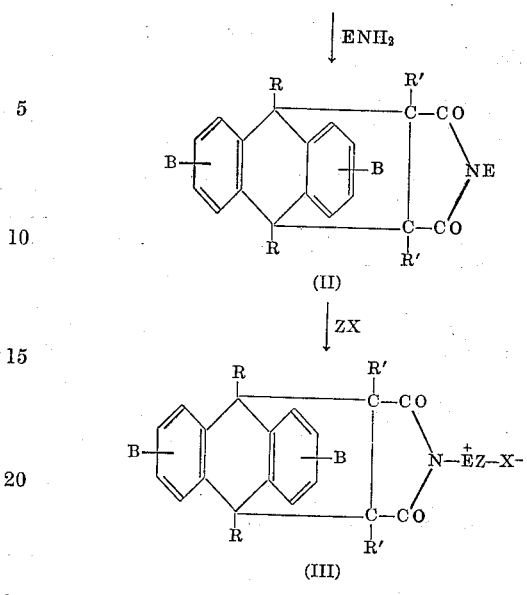

The starting ethanoanthracene anhydride (I) can be prepared as described in JACS 60, 481, by heating anthracene or a substituted anthracene with maleic anhydride or an alkylmaleic anhydride in benzene under Diels-Alder Reaction conditions. The preparation of alkylmaleic anhydrides is given in J. Org. Chem. 81, 673 (1956).

Where the starting ethanoanthracene anhydride is not functionally substituted; i.e., where B is hydrogen; the product of Formula II can be nitrated with fuming nitric acid to produce the corresponding product where either or both of the substituents B (depending on the amount of nitric acid used) is $NO_2$. The nitro compound thus obtained can have its nitro function reduced to amino by hydrogenating in the presence of a catalytic amount of palladium on charcoal.

The following examples are intended to illustrate but not to limit the invention. For the sake of conciseness, the various examples are grouped according to Formulas II and III (above) with the various symbols being as defined for the respective formulas.

The synthesis of a representative compound of the type listed in Table I (Example 8) is the following:

To a suspension of 14 g. of 9,10-dihydro-9,10-ethano anthracene-11,12-dicarboxylic anhydride in 50 ml. of dimethylformamide is added 6.5 g. of N-ethyl-3-amino piperidine. The mixture is shaken and the solid gradually dissolves with evolution of heat. After filtering out dark impurities, the filtrate is diluted with five volumes of water to give a white viscous oil. Upon being rubbed with a glass rod, this becomes solid within an hour and can be filtered and recrystallized from methyl ethyl ketone to give 18 g. of N-(1-ethyl-3-piperidyl-9,10-dihydro-9,10-ethano anthracene-11,12-dicarboxylic acid imide melting at 175–6°.

The synthesis of a representative compound of the type listed in Table II (Example 18) is the following:

A solution of 10 g. of N-3-piperidyl-9,10-dihydro-9,10-ethanoanthracene-11,12-dicarboxylic acid imide in 15 ml. of hot toluene is mixed with 5 ml. of crotyl bromide and the solution is heated on a steam bath for four hours. A white precipitate soon appears and gradually fills the flask. After cooling, filtering and crystallizing from ethanol, one obtains 5 g. of 1'-(2-butenyl)-1'-ethyl-3'-(9,10 - dihydro - 9,10 - ethanoanthracene - 11,12 - dicarboximido)-piperidinium bromide hemihydrate, melting at 295–6°.

TABLE I.—COMPOUNDS OF FORMULA II

| Ex. | Compound Name | M.P., °C. | E | R | R¹ | B | Empirical Formula | Activity |
|---|---|---|---|---|---|---|---|---|
| 1 | N-(p-diethylaminophenyl)-9,10-dihydro-9,10-ethanoanthracene-11,12-dicarboximide. | 252-3 | —C₆H₄—NEt₂ | H | H | H | $C_{26}H_{26}N_2O_2$ | Hypotensive. |
| 2 | 9,10-dihydro-N-(3-pyridyl)-9,10-ethanoanthracene-11,12-dicarboximide. | 235-6 | 3-pyridyl | H | H | H | $C_{23}H_{16}N_2O_2$ | Depressant. |
| 3 | N-(p-dimethylaminophenyl)-9,10-dihydro-9,10-ethanoanthracene-11,12-dicarboximide. | 258-9 | —C₆H₄—NMe₂ | H | H | H | $C_{26}H_{22}N_2O_2$ | Depressant, hypotensive. |
| 4 | N-(2-pyridyl)-9,10-dihydro-9,10-ethanoanthracene-11,12-dicarboximide. | 253-4 | 2-pyridyl | H | H | H | $C_{23}H_{16}N_2O_2$ | Do. |
| 5 | 9,10-dihydro-N-(4,6-dimethyl-2-pyridyl)-9,10-ethanoanthracene-11,12-dicarboximide. | 292-3 | 4,6-dimethyl-2-pyridyl | H | H | H | $C_{25}H_{20}N_2O_2$ | Depressant. |
| 6 | N-(5-chloro-2-pyridyl)-9,10-dihydro-9,10-ethanoanthracene-11,12-dicarboximide. | 283-4 | 5-chloro-2-pyridyl | H | H | H | $C_{23}H_{15}ClN_2O_2$ | Do. |
| 7 | 9,10-dihydro-N-(1H-1,2,4-triazol-3-yl)-9,10-ethanoanthracene-11,12-dicarboximide. | >320 | 1H-1,2,4-triazol-3-yl | H | H | H | $C_{20}H_{14}N_4O_2$ | Do. |
| 8 | N-(1-ethyl-3-piperidyl)-9,10-dihydro-9,10-ethanoanthracene-11,12-dicarboximide. | 175-6 | 1-ethyl-3-piperidyl | H | H | H | $C_{25}H_{26}N_2O_2$ | Depressant, mydriatic, hypotensive. |
| 9 | N-piperidino-9,10-dihydro-9,10-ethanoanthracene-11,12-dicarboximide. | 203-4 | —N(piperidino) | H | H | H | $C_{23}H_{22}N_2O_2$ | Depressant, sedative. |
| 10 | N-guanidino-9,10-dihydro-9,10-ethanoanthracene-11,12-dicarboximide. | >320 | —NHC(=NH)NH₂ | H | H | H | $C_{19}H_{16}N_4O_2$ | Depressant. |
| 11 | N-allyl-9,10-dihydro-9,10-ethanoanthracene-11,12-dicarboximide. | 176-7 | —CH₂CH=CH₂ | H | H | H | $C_{21}H_{17}NO_2$ | Do. |
| 12 | N-amino-9,10-dihydro-9,10-ethanoanthracene-11,12-dicarboximide. | 289-90 | —NH₂ | H | H | H | $C_{18}H_{14}N_2O_2$ | Anticonvulsant. |
| 13 | N-(3,4-dimethoxyphenethyl)-9,10-dihydro-9,10-ethanoanthracene-11,12-dicarboximide. | 191-2 | —CH₂CH₂—C₆H₃(OMe)(OMe) | H | H | H | $C_{26}H_{25}NO_4$ | Depressant. |

TABLE II.—COMPOUNDS OF FORMULA III

| A Ex. | Compound Name | M.P., °C. | EZ | X | R | Formula | Activity |
|---|---|---|---|---|---|---|---|
| 14 | 1-allyl-3-(9,10-dihydro-9,10-ethanoanthracene-11,12-dicarboximido)pyridinium bromide. | 150 | pyridinium, N-CH₂—CH=CH₂ | Br·½H₂O | H | $C_{26}H_{21}BrN_2O_3·½H_2O$ | Depressant. |
| 15 | [p-(9,10-dihydro-9,10-ethanoanthracene-11,12-dicarboximido)phenyl]trimethyl ammonium methosulfate. | >320 | —C₆H₄—NMe₃ | MeSO₄ | H | $C_{28}H_{28}N_2O_6S$ | Do. |
| 16 | Allyl[p-(9,10-dihydro-9,10-ethanoanthracene-11,12-dicarboximido)phenyl]dimethyl ammonium bromide. | 189-90d. | —C₆H₄—NMe₂CH₂CH=CH₂ | Br | H | $C_{29}H_{27}BrN_2O_2$ | Do. |
| 17 | 1-allyl-1-ethyl-3-(9,10-dihydro-9,10-ethanoanthracene-11,12-dicarboximido)piperidinium bromide. | 248-9d | piperidinium, N(Et)(CH₂CH=CH₂) | Br·½H₂O | H | $C_{28}H_{31}BrN_2O_2·½H_2O$ | Depressant, mydriatic. |
| 18 | 1'-(2-butenyl)-1'-ethyl-3'-(9,10-dihydro-9,10-ethanoanthracene-11,12-dicarboximido)piperidinium bromide hemihydrate. | 195-6 | piperidinium, N(Et)(CH₂CH=CHCH₃) | Br·½H₂O | H | $C_{29}H_{33}BrN_2O_2·½H_2O$ | Do. |

TABLE II—Continued

| Ex. | A | M.P., °C. | EZ | X | R | Formula | Activity |
|---|---|---|---|---|---|---|---|
| 19 | Diethyl[p-(9,10-dihydro-9,10-ethanoanthracene-11,12-dicarboximido)phenyl] methylammonium methosulfate. | 310d. | —C₆H₄—NEt₂Me | MeSO₄·½H₂OH | H | $C_{30}H_{33}N_3O_6S·½H_2O$ | Hypotensive depressant. |
| 20 | 1-allyl-2-(9,10-dihydro-9,10-ethanoanthracene-11,12-dicarboximidomethyl) pyridinium bromide. | 210-11 | —CH₂—(pyridyl, N-CH₂CH=CH₂) | Br·½H₂O | H | $C_{27}H_{25}BrN_2O_2·½H_2O$ | Depressant. |

The following examples illustrate the preparation of additional compounds comprehended within the present inventive scope:

Example 19

Preparation of N-amino-2-nitro-9-ethyl-9,10-dihydro-9,10-ethanoanthracene-11-n-propyl-11,12-dicarboximide (1) Preparation of N-amino-9-ethyl-9,10-dihydro-9,10-ethanoanthracene-11-n-propyl - 11,12-dicarboximide: (A) 9,10-ethyl-9,10-dihydro-9,10-ethanoanthracene-11-n-propyl-11,12-dicarboxylic anhydride: A solution of 0.1 mol. of 9-ethylanthracene and 1 mol. of n-propyl succinic anhydride in 500 ml. of benzene is heated overnight on a steam bath. Upon concentrating and cooling, the product crystallizes and is collected on a filter. (B) A solution of the product from A in 100 ml. of dimethylformamide and 0.1 mol. of hydrazine hydrate is heated overnight on a steam bath. Upon dilution with cold water, N-amino-9-ethyl-9,10-dihydro-9,10-ethanoanthracene-11-n-propyl-11,12-dicarboximide separates and is collected on a filter. It is recrystallized from dimethylformamide.

(2) To a solution at room temperature of 0.1 mole of N-amino-9-ethyl - 9,10-dihydro-9,10 - ethanoanthracene-11-n-propyl-11,12-dicarboximide prepared as above in 150 ml. of concentrated nitric acid, is added dropwise with stirring 10 ml. of red fuming nitric acid. The temperature is allowed to rise to 40° C. and is held there for three hours by cooling. The reaction mixture then is poured on 1 kg. of ice and is made alkaline by the addition of 10% sodium hydroxide. This causes separation of the product which can be recrystallized from ethanol.

Example 20

Preparation of N-amino-2-amino-9-ethyl-9,10-dihydro-9,10-ethanoanthracene-11-n-propyl-11,12-dicarboximide 0.02 mole of N-amino-2-nitro-9-ethyl-9,10-dihydro-9,10-ethanoanthracene-11-n-propyl - 11,12-dicarboximide in 100 ml. of 10% acetic acid and 3 g. of 10% palladium on charcoal is shaken with hydrogen for three hours until about 0.06 moles of hydrogen have been absorbed. The catalyst is filtered out, the product is precipitated by adding an excess of 10% sodium hydroxide and is recrystallized from ethanol.

The compounds of this invention can be administered with pharmaceutically acceptable inert carriers in a wide variety of oral or parenteral unit dosage forms containing 25, 100, 250 or 500 mg. of active ingredients for the symptomatic adjustment of the dosage, or in admixture with other active compounds. In the case of the compounds encompassed by Formula II intraperitoneal administration is preferred. The dosage range for humans ranges between 0.1 to 3 grams per day depending upon various factors such as the general condition of the patient and the severity of the condition to be managed. It is found generally that when the compounds are administered orally, larger amounts thereof are required to produce the same effect as a smaller amount given parenterally.

The present invention also includes the process of bringing the compounds thereof into a form suitable for therapeutic administration by associating them with liquid or solid, pharmaceutically acceptable carriers.

What is claimed is:

1. A compound represented by the formula:

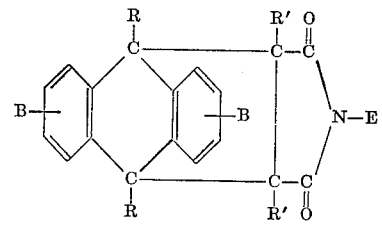

wherein B is selected from the group consisting of hydrogen, amino and nitro, R and R' are selected from the group consisting of hydrogen and lower alkyl and E is selected from the group consisting of: di(lower)alkylaminophenyl, di(lower)alkyl-2-pyridyl, 2-pyridylmethyl, halo-2-pyridyl, triazolyl, 3-piperidyl, piperidino, lower alkynyl, amino, di(lower)alkoxyphenethyl and quanidino; and the quaternary ammonium salts thereof with (lower) alkyl, (lower)alkenyl and (lower)alkynyl sulfates and halides.

2. N - (p - diethylaminophenyl) - 9,10-dihydro-9,10-ethanoanthracene-11,12-dicarboximide.

3. N-(p - dimethylaminophenyl) - 9,10 - dihydro-9,10-ethanoanthracene-11,12-dicarboximide.

4. 9,10 - dihydro-N-(4,6 - dimethyl-2-pyridyl) - 9,10-ethanoanthracene-11,12-dicarboximide.

5. N-(5-chloro-2-pyridyl)-9,10 - dihydro-9,10-ethanoanthracene-11,12-dicarboximide.

6. 9,10-dihydro-N-(1H-1,2,4 - triazol-3-yl)-9,10-ethanoanthracene-11, 12-dicarboximide.

7. N-(1-ethyl-3-piperidyl)-9,10 - dihydro-9,10-ethanoanthracene-11,12-dicarboximide.

8. N-piperidino-9,10-dihydro-9,10 - ethanoanthracene-11,12-dicarboximide.

9. 1-allyl-3-(9,10-dihydro-9,10 - ethanoanthracene-11,12-dicarboximido)pyridinium salt.

10. [p-(9,10-dihydro-9,10 - ethanoanthracene-11,12-dicarboximido)phenyl]trimethyl ammonium salt.

11. Allyl[p-(9,10-dihydro-9,10 - ethanoanthracene-11,12-dicarboximido)phenyl]dimethyl ammonium salt.

12. 1-allyl-1-ethyl-3 - (9,10 - dihydro - 9,10 - ethanoanthracene-11,12-dicarboximido)piperidinium bromide.

13. 1-(2-butenyl)-3-(9,10-dihydro-9,10 - ethanoanthracene-11,12-dicarboximido)-1-ethylpiperidinium bromide.

14. Diethyl[p-9,10 - dihydro-9,10 - ethanoanthracene-11,12-dicarboximido)phenyl]methylammonium salt.

(References on following page)

References Cited

UNITED STATES PATENTS 3,123,618  3/1964  Schumann et al. _____ 260—295
3,135,749  6/1964  Clinton et al. _____ 260—294.7

FOREIGN PATENTS

38/17,827  9/1963  Japan.

OTHER REFERENCES

Copa: Chem. Abst., vol. 55, 12374b (1961).
Kitamogi et al., Chem. Abst., vol. 60, 4113c (1964).

JOHN D. RANDOLPH, *Primary Examiner.*
WALTER A. MODANCE, *Examiner.*
A. D. SPEVACK, *Assistant Examiner.*